US006518371B1

(12) United States Patent
Fink et al.

(10) Patent No.: US 6,518,371 B1
(45) Date of Patent: Feb. 11, 2003

(54) CROSSLINKING AGENTS

(75) Inventors: Peter Fink, Mehring; Peter Jerschow, Burghausen; Hedwig Schreiter, Tittmoning; Richard Birneder, Simbach; Alois Riedl, Burghausen, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/565,630

(22) Filed: May 4, 2000

(30) Foreign Application Priority Data

May 6, 1999 (DE) .......................... 199 20 954

(51) Int. Cl.⁷ .................... C08G 77/12; C08G 77/20
(52) U.S. Cl. .................... 525/478; 528/14; 528/15; 528/32; 528/31; 528/39; 556/458; 556/479; 556/451; 525/477
(58) Field of Search .............. 528/14, 15, 32, 528/31, 39; 556/458, 479, 451, 477, 478

(56) References Cited

U.S. PATENT DOCUMENTS

| | | | |
|---|---|---|---|
| 4,539,357 A | * | 9/1985 | Bobear |
| 4,774,310 A | * | 9/1988 | Butler |
| 5,446,185 A | | 8/1995 | Cobb et al. |
| 5,527,935 A | | 6/1996 | Stepp et al. |

FOREIGN PATENT DOCUMENTS

| | | |
|---|---|---|
| DE | 2 041 633 | 3/1971 |
| DE | 43 32 425 A1 | 3/1995 |
| EP | 0 251 435 A1 | 1/1988 |
| EP | 0 565 238 A2 | 10/1993 |
| EP | 0 568 318 A1 | 11/1993 |
| GB | 1 272 705 | 5/1972 |
| WO | WO97/09370 | 3/1997 |

* cited by examiner

Primary Examiner—Margaret G. Moore
Assistant Examiner—Kio-Liang Peng
(74) Attorney, Agent, or Firm—Brooks & Kushman P.C.

(57) ABSTRACT

A polyorganosiloxane containing the units $(HR_2Si\!-\!O_{1/2})$ HM units, $(Si\!-\!O_{4/2})$ Q units, $(R_1Si\!-\!O_{3/2})$ T units and $(R_2Si\!-\!O_{2/2})$ D units in a ratio of from 2:1:0:0 to 6:4:2:2, or $(HR_2Si\!-\!O_{1/2})$ HM units, $(R_1Si\!-\!O_{3/2})$ T units, $(R_2Si\!-\!O_{2/2})$ D units and $(R_2(R^1O)Si\!-\!O_{1/2})$ in a ratio HM:T:D:alkoxyM of from 1:2:0:0 to 3:4:2:2 is described, where R are identical or different, non-halogenated or halogenated hydrocarbon radicals having from 1 to 18 carbon atoms per radical, or are $OR^1$, where $R^1$ is a monovalent, unsubstituted or substituted hydrocarbon radical having from 1 to 8 carbon atoms, and in each molecule there are at least 3 Si-bonded hydrogen atoms. The polyorganosiloxanes are particularly useful as crosslinking agents in addition curable elastomer formulations.

4 Claims, No Drawings

CROSSLINKING AGENTS

TECHNICAL FIELD

The invention relates to Si—H functional polyorganosiloxanes, to compositions which comprise this polyorganosiloxane, to processes for preparing silicone elastomers employing the Si—H functional polyorganosiloxane, and to crosslinkable compositions having exceptional properties, employing the Si—H functional polyorganosiloxanes together with conventional Si—H polyorganosiloxanes.

BACKGROUND ART

Crosslinking agents for addition-crosslinking polymer compositions having Q units and a hydrogen content of 1% are known from EP-A 0 565 238. A disadvantage of such compositions are slow vulcanization and therefore a long cycle time for injection molding, and unsatisfactory mechanical properties.

DISCLOSURE OF INVENTION

The object of the invention is to improve upon prior art crosslinkers and elastomers, and in particular to provide Si—H functional crosslinking agents and compositions which improve the tear propagation resistance, elongation at break, and ultimate tensile strength of organopolysiloxane elastomer compositions.

BEST MODE FOR CARRYING OUT THE INVENTION

The invention provides a polyorganosiloxane containing the units ($HR_2Si—O_{1/2}$) HM units, ($Si—O_{4/2}$) Q units, ($R_1Si—O_{3/2}$) T units and ($R_2Si—O_{2/2}$) D units in a HM:Q:T:D units ratio of from 2:1:0:0 to 6:4:2:2, or ($HR_2Si—O_{1/2}$) HM units, ($R_1Si—O_{3/2}$) T units, ($R_2Si—O_{2/2}$) D units and ($R_2(R^1O)Si—O_{1/2}$) "alkoxyM" units in a HM:T:D:alkoxy-M ratio of from 1:2:0:0 to 3:4:2:2, where R are identical or different, optionally halogenated hydrocarbon radicals having from 1 to 18 carbon atoms per radical, or are $OR^1$, where $R^1$ is a monovalent, unsubstituted or substituted hydrocarbon radical having from 1 to 8 carbon atoms, and in each molecule there are at least 3 Si-bonded hydrogen atoms.

Examples of radicals R are preferably alkyl radicals such as the methyl, ethyl, n-propyl, isopropyl, n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; alkenyl radicals such as the vinyl radical and the allyl radical; and cycloalkyl radicals such as the cyclopentyl, cyclohexyl, cycloheptyl, and methylcyclohexyl radicals.

Examples of substituted radicals R are cyanoalkyl radicals such as the β-cyanoethyl radical, and halogenated hydrocarbon radicals, for example haloalkyl radicals such as the 3,3,3-trifluoro-n-propyl radical, the 2,2,2,2',2',2'-hexafluoroisopropyl radical, and the heptafluoroisopropyl radical.

The methyl and ethyl radicals are preferred as radical R simply because they are more easily accessible.

Radical $R^1$ is preferably a hydrogen atom or an optionally substituted hydrocarbon radical having from 1 to 8 carbon atoms, more preferably hydrogen and alkyl radicals having from 1 to 3 carbon atoms, and most preferably methyl, ethyl and isopropyl radicals.

Additional preferred polyorganosiloxanes are those having the formula $(H(CH_3)_2SiO)_4Si$ (=HM4Q) or $(H(CH_3)_2SiO)_3SiCH_3$ (=HM3T).

The viscosity of the novel polyorganosiloxanes is preferably from 10 to 500,000 mPa·s, more preferably from 10 to 100,000 mPa·s, and most preferably from 10 to 10,000 mPa·s. The viscosities of HM4Q and HM3T are between 0.001 and 1000 mPa·s.

The novel polyorganosiloxanes are also used as hardness-reducing constituents.

The invention also provides a composition comprising a silicone polymer bearing unsaturated groups, a catalyst, and the polyorganosiloxane described above. Compositions of this type usually comprise silicone polymers (1) having alkenyl groups, where the alkenyl groups are preferably vinyl or allyl groups, and these are preferably polydimethylsiloxanes having vinyl end groups. Amounts of from 55 to 85% by weight of these are present. Their preparation is described, for example, in EP 208 285. Their viscosity is preferably from 0.5 to 500 Pa·s, preferably from 1 to 100 Pa·s and most preferably 4 to 50 Pa·s at a temperature of 25° C.

The silicone rubber compositions which crosslink to give elastomers optionally also comprise reinforcing or non-reinforcing fillers (2). Examples of non-reinforcing fillers are substances with a BET surface area below 50 $m^2/g$, such as powdered quartz, diatomaceous earth, chalk, kaolins and silicates. For the purposes of the present invention, reinforcing fillers are those with a BET surface area of 50 $m^2/g$ or above, for example fumed silica. Preference is given to reinforcing fillers with BET surface areas of from 150 to 300 $m^2/g$. These may also have been hydrophobicized. The amounts used are from 0 to 40% by weight.

The crosslinking agents (3) comprise the novel crosslinking agents, which are present in amounts of from 0.5 to 70% by weight.

Conventional platinum hydrosilylation catalysts may be used as hydrosilylation catalyst (4), catalyzing the addition reaction between the alkylene groups in the polyorganosiloxane (1) described above and the silicon-bonded hydrogen atoms in the novel crosslinking agent (3). In general, any hydrosilylation catalyst for addition-crosslinking silicone rubber compositions may be used. Those preferably used are metal-containing catalysts, such as platinum, palladium, iridium, rhodium and ruthenium, with preference given to platinum and platinum compounds. Particular preference given to is given to polyorganosiloxane-soluble platinum-vinylsiloxane complexes and hexachloroplatinic acid. The amounts of these catalysts which are added to the compositions crosslinkable to give elastomers, are from 0.1 to 500 ppm by weight. It is preferable to use from 5 to 100 ppm by weight of catalyst calculated as platinum metal, and the vulcanization rate can be controlled by varying the amounts used.

Additives (5) which serve to adjust the pot life of the curable rubber compositions may also be present if desired. These are known inhibitors, such as 2-methyl-3-butyn-2-ol, 1,3-divinyl-1,1,3,3-tetramethyldisiloxane and ethynylcyclohexanol. The amounts preferably used of the inhibitor are from 0.01 to 0.2% by weight, based on the total weight of the respective components listed below.

Since the composition is per se reactive and therefore vulcanizes slowly at room temperature, the mixture is generally prepared as two components, of which one may comprise 1, 2, 4 and 5 and the other 1, 2, 3, and 5. The components are mixed by machine shortly before processing and are then processed by injection molding, extrusion, transfer molding or rotational and centrifugal casting processes.

The present invention markedly improves the mechanical properties and the vulcanization properties. For example, tear propagation resistance is increased, and elongation at break for a 30 Shore type elastomer increases from about 700 to just below 1000. Also, surprisingly, the onset temperature decreases from 140° C. in typical prior art elastomers to sometimes below 100° C. with the novel crosslinking agent, while the pot life remains at more than 3 days.

The compounds according to the invention may also be used in a blend with any desired linear or branched polydimethylsiloxane polymer which has at least one SiH group or Si-alkenyl group, preferably an Si-vinyl group.

The silicone polymer used having alkenyl groups may also comprise a polydiorganosiloxane polymer such as polydimethylsiloxane having alkenyl groups, preferably vinyl groups or allyl groups, pendant to the chain in addition to or instead of terminal alkenyl groups. This then gives Shore hardnesses of from 40 to 60. The amount of this polymer used is preferably from 2 to 50% by weight, with preference from 2 to 20% by weight. This polymer may also be used together with polymers which have terminal alkenyl groups, e.g. vinyl groups or allyl groups, or are terminated with epoxy groups or methyl groups. The ratio of alkenyl-terminated polymer to polymers having vinyl D units within the chain is preferably from 25:1 to 2.5:1, more preferably from 12:1 to 4:1.

Adding resinous alkenyl-functional polyorganosiloxanes (vinyl-water glass resin) moreover brings about a marked improvement in the notch resistance (tear propagation resistance) of the fully cured silicone rubber compositions (see Example 4). These resins are composed of units of $R_3SiO_{1/2}$, $RSiO_{3/2}$ and/or $SiO_{4/2}$, and the molar ratio between the monofunctional and tri- or tetrafunctional units is from 0.4:1 to 1.5:1. The amount of these resins which may be added to the composition of components (1) to (4), is preferably from 0 to 20% by weight.

The advantages of the present invention are that the onset temperature is, surprisingly, from 80° C. to 120° C. and that the final mixture has a long pot life and processing time of more than 3 days at room temperature. Added to this desirable pot life and low onset temperature are good processibility; the ease of removing compositions containing the compound according to the invention or elastomers molded therefrom, from metal or plastic molds; a high elongation at break of up to 1500%; and a high tear propagation resistance of up to 60 N/mm.

The described compositions with the novel crosslinking agent may be processed by injection molding, transfer molding, press vulcanization, extrusion, centrifugal casting, calendering, bead application or blow molding.

Elastomers with the novel crosslinking agent are used in producing sports products, diving masks, ventilator bellows, balloon catheters, rubber teats, pacifiers, thin-walled membranes, switch covers, spark-plug connectors, medical products, electrical insulators, single-wire seals, plug connector seals, tubing and valves, and in "cold-shrink technology", etc.

EXAMPLE I

Example of the preparation of the H-Si-containing crosslinking agent:

8544 g of methyltriethoxysilane, 3216 g of tetramethyldihydrogensiloxane and 60 g of dimethylhydrogenchlorosilane form an initial charge and are stirred while 3600 g of deionized water is run in within a period of 1 h. This is followed by cooling for 1 h at ambient humidity (77%) to 40° C. 36 g of $NaHCO_3$ are added and the mixture is stirred at 40° C. for 1 h and then filtered.

The polyorganosiloxane has the units $HM:D:T:EtO_{1/2}$ in a ratio of 1:0.108:1.817:0.0526 and is obtained in a yield of 5303 g.

EXAMPLE C1 (comparative)

A base mixture (a) was prepared by mixing, 68 parts by weight of a polydimethylsiloxane (viscosity 20 Pa·s) having vinyldimethylsiloxy groups as terminal units, with 32 parts by weight of a hydrophobicized fumed silica with a BET surface area of 300 $m^2/g$, to give a homogeneous mixture. Preferable mixing assemblies are kneaders, although other mixers can be used as desired.

The base mixture (a) was used to obtain component A by adding 0.16 part by weight of platinum-vinylsiloxane complex (4) and 0.06 part by weight of ethynylcyclohexanol to 100 parts by weight of mixture (a).

Component B was obtained by adding 4.2 parts by weight of a copolymer composed of dimethylsiloxane units, methylhydrogen siloxane units and trimethylsiloxane units and having an Si—H content of about 0.45%, and 0.06 part by weight of ethynylcyclohexanol, to 100 parts by weight of base mixture (a).

The two components A and B were intimately mixed in a ratio of 1:1 and the mixture was used to produce vulcanizate sheets with thicknesses of 2 and 6 mm respectively (vulcanization conditions: 5 min/165° C.).

EXAMPLE 2

Component A was obtained from the base mixture (a) of Example C1 by adding 0.16 part by weight of platinum-vinylsiloxane complex (4) and 0.06 part by weight of ethynylcyclohexanol to 100 parts by weight of mixture (a).

Component B was obtained by adding 3.0 parts by weight of the novel network-type polyorganosiloxane as in Example [I] 1 (3) and 0.06 part by weight of ethynylcyclohexanol to 100 parts by weight of base mixture (a).

The two components A and B were intimately mixed in a ratio of 1:1 and the mixture was used to produce vulcanizate sheets with thicknesses of 2 and 6 mm respectively (vulcanization conditions: 5 min/165° C.).

EXAMPLE 3

A base mixture (b) was prepared by mixing 59 parts of a polydimethylsiloxane (viscosity 100 Pa·s) having vinyldimethylsiloxy groups as terminal units, 9 parts by weight of a polydimethylsiloxane composed of trimethylsiloxy groups and methylvinylsiloxy groups, and 32 parts of a hydrophobicized, fumed silica with a BET surface area of 300 $m^2/g$, to give a homogeneous mixture, preferably using mixing assemblies suitable for this purpose, e.g. a kneader.

The base mixture (b) was used to obtain component A by adding 0.16 part by weight of platinum-vinylsiloxane complex (4) and 0.06 part by weight of ethynylcyclohexanol to 100 parts by weight of mixture (b).

Component B was obtained by adding 4.5 parts by weight of a copolymer composed of dimethylsiloxane units, methylhydrogen units and trimethylsiloxane units as in Example 1, or alternatively in Example C1 and 0.06 part by weight of ethynylcyclohexanol to 100 parts by weight of base mixture (b).

The two components A and B were intimately mixed in a ratio of 1:1 and the mixture was used to produce vulcanizate sheets with thicknesses of 2 and 6 mm respectively (vulcanization conditions: 5 min/165° C.).

EXAMPLE 4

Component A was obtained from the base mixture (a) of Example 1 by adding 0.16 part by weight of platinum-vinylsiloxane complex (4), 15 parts by weight of a polyorganosiloxane having a viscosity of 20 Pa·s and containing vinyl resin and 0.06 part by weight of ethynylcyclohexanol to 100 parts by weight of mixture (a).

Component B was obtained by adding 5.0 parts by weight of a copolymer composed of dimethylsiloxane units, methylhydrogen units and trimethylsiloxane units as in Example 1, 15 parts by weight of a polyorganosiloxane having a viscosity of 20 Pa·s and containing resin and 0.06 part by weight of ethynylcyclohexanol to 100 parts by weight of initial mixture (a).

The two components A and B were intimately mixed in a ratio of 1:1 and the mixture was used to produce vulcanizate sheets with thicknesses of 2 and 6 mm respectively (vulcanization conditions: 5 min/165° C.).

EXAMPLE C5 (comparative)

A base mixture (c) was prepared by mixing, in each case 72 parts of a polydimethylsiloxane (viscosity 20 Pa·s) having vinyldimethylsiloxy groups as terminal units with 28 parts of a hydrophobicized, fumed silica with a BET surface area of 300 m²/g, to give a homogeneous mixture, preferably using mixing assemblies suitable for this purpose, e.g. a kneader.

The base mixture (c) was used to obtain component A by adding 0.16 part by weight of platinum-vinylsiloxane complex (4) and 0.06 part by weight of ethynylcyclohexanol to 100 parts by weight of mixture (c).

Component B was obtained by adding 3.0 parts by weight of a copolymer composed of dimethylsiloxane units, methylhydrogen units and trimethylsiloxane units and having an Si—H content of about 0.45% and 0.06 parts by weight of ethynylcyclohexanol to 100 parts by weight of base mixture (a).

The two components A and B were intimately mixed in a ratio of 1:1 and the mixture was used to produce vulcanizate sheets with thicknesses of 2 and 6 mm respectively (vulcanization conditions: 5 min/165° C.).

EXAMPLE 6

A base mixture (c) was prepared by mixing, in each case, 72 parts of a polydimethylsiloxane (viscosity 20 Pa·s) having vinyldimethylsiloxy groups as terminal units, and 28 parts of a hydrophobicized, fumed silica with a BET surface area of 300 m²/g, to give a homogeneous mixture, preferably using mixing assemblies suitable for this purpose, e.g. a kneader.

The base mixture (c) was used to obtain component A by adding 0.16 part by weight of platinum-vinylsiloxane complex (4) and 0.06 part by weight of ethynylcyclohexanol to 100 parts by weight of mixture (c).

Component B was obtained by adding 3.5 parts by weight of the novel network-type polyorganosiloxane (3) as in Example 1 and 0.06 part by weight of ethynylcyclohexanol to 100 parts by weight of base mixture (c).

The two components A and B were intimately mixed in a ratio of 1:1 and the mixture was used to produce vulcanizate sheets with thicknesses of 2 and 6 mm respectively (vulcanization conditions: 5 min/165° C.).

Mechanical Properties:

| Example | C1 | 2 | 3 | 4 | C5 | 6 |
|---|---|---|---|---|---|---|
| Hardness, Shore A | 52 | 47 | 53 | 52 | 34 | 28 |
| Ultimate Tensile Strength [N/mm²] | 9.1 | 13 | 9.2 | 9.2 | 7.1 | 9.7 |
| Elongation at Break [%] | 460 | 800 | 520 | 470 | 570 | 990 |
| Tear Propagation Resistance [N/mm] | 28.4 | 37.4 | 51 | 40.9 | 21.8 | 34 |
| Onset Temperature [° C.] | 115 | 101 | 116 | 111 | 115 | 100 |

All of the values were obtained after annealing the test specimens for 4 hours at 200° C. Another advantage of the SiH donor used, as in Example 6, is its hardness-lowering effect. A conventional mixing specification gives a hardness of 34 in Example 5. The novel crosslinking agents give a hardness of 28, with notable improvements in the other mechanical properties.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An addition-crosslinkable composition comprising a silicone polymer bearing unsaturated groups, a hydrosilylation catalyst, and a Si—H functional polyorganosiloxane containing HM units (HR$_2$Si—O$_{1/2}$), Q units (Si—O$_{4/2}$), T units (R$_1$Si—O$_{3/2}$) and D units (R$_2$Si—O$_{2/2}$) in a ratio HM:Q:T:D units of from 2:1:0:0 to 6:4:2:2, or containing HM units (HR$_2$Si—O$_{1/2}$), T units (R$_1$Si—O$_{3/2}$), D units (R$_2$Si—O$_{2/2}$) and alkoxyM units (R$_2$(R$^1$O)Si—O$_{1/2}$) in a ratio HM:T:D:alkoxyM units of from 1:2:0:0 to 3:4:2:2, where R are identical or different, optionally halogenated hydrocarbon radicals having from 1 to 18 carbon atoms per radical, or are OR$^1$, where R$^1$ is a monovalent, optionally substituted hydrocarbon radical having from 1 to 8 carbon atoms, and wherein said organopolysiloxane contains at least 3 Si-bonded hydrogen atoms further comprising a vinyl-water glass resin.

2. The composition of claim 1, which comprises a mixture of a silicone polymer bearing terminal alkenyl groups and a silicone polymer bearing pendant alkenyl groups.

3. The composition of claim 1 wherein said polyorganosiloxane comprises at least one compounds selected from the group consisting of (H(CH$_3$)$_2$SiO)$_4$Si and (H(CH$_3$)$_2$ SiO)$_3$SiCH$_3$.

4. The composition of claim 2 wherein said polyorganosiloxane comprises at least one compounds selected from the group consisting of (H(CH$_3$)$_2$SiO)$_4$Si and (H(CH$_3$)$_2$ SiO)$_3$SiCH$_3$.

* * * * *